United States Patent [19]

Hillekens

[11] 3,836,727

[45] Sept. 17, 1974

[54] SIGNAL RECEIVER FOR RECEIVING SIGNALS OF DIFFERENT FREQUENCY

[75] Inventor: Conrardus Ludovicus Anthonius Hillekens, Hilversum, Netherlands

[73] Assignee: U.S. Philips Corporation, New York, N.Y.

[22] Filed: June 29, 1973

[21] Appl. No.: 374,905

Related U.S. Application Data

[63] Continuation of Ser. No. 221,245, Jan. 27, 1972, abandoned.

[52] U.S. Cl. .......... 179/84 VF

[51] Int. Cl. .......... H04m 1/50

[58] Field of Search .......... 179/2.5 A, 2.5 R, 84 VF, 179/175.2, 175.2 A

[56] References Cited

UNITED STATES PATENTS 3,470,532 9/1969 Martens .......... 179/84 VF

*Primary Examiner*—Ralph D. Blakeslee

*Attorney, Agent, or Firm*—Frank R. Trifari

[57] ABSTRACT

A signal receiver for receiving signals of different frequencies comprising a group of frequency channels; each of which comprises a filter device tuned to a signal frequency and a detector connected to the filter. A device responsive to increases in the signal amplitudes is coupled to the filter devices of the group of frequency channels. A signal testing device is connected to the output of and is continuously activated by the device responding to increases in the signal amplitude to determine the validity of the received signals. The device for responding to increases in the signal amplitude comprises a smoothing filter connected to the detector, a first threshold circuit for obtaining a threshold value determined by the amplitude of the signals supplied to the detector, and a second threshold device for limiting the varying threshold value to a given value.

4 Claims, 6 Drawing Figures

SIGNAL RECEIVER FOR RECEIVING SIGNALS OF DIFFERENT FREQUENCY

This is a continuation of application Ser. No. 221,245, filed 1/27/72 now abandoned.

The invention relates to a signal receiver for receiving signals of different frequency, comprising a group of frequency channels and a signal-testing device, each frequency channel comprising a filter device which is tuned to a signalling frequency and a detector which is connected thereto, said detector being coupled to the signal-testing device for determining the validity of the received signals.

Signal receivers of this kind are used inter alia in tone-frequency push-button signalling systems for subscriber selection in automatic telephony systems. In a known signal receiver the signals are applied to the group of frequency channels via an amplitude limiter. Each of the said filter devices comprises a series-resonant circuit which is tuned to one of the signalling frequencies. The output voltage of a filter device is taken off across the inductance of the resonant circuit and is applied to the detector, having an output to which a normally cut-off signal source is connected, one of said signal sources being provided for each frequency channel. The detector is connected to the signal-testing device via an amplitude discriminator.

A signal supplied by the amplitude limiter and containing a signalling frequency will build up a signal increasing in amplitude across the inductance of the filter device tuned thereto during the build-up period of the circuit. The fixed discrimination level of the amplitude discriminator has a value such that only a tone signal which is applied to the filter device and which contains substantially the total energy supplied by the amplitude limiter is capable of building up a voltage across the inductance of the filter unit which is sufficiently large as to exceed this discrimination level. When the discrimination level is exceeded by a tone signal, the signal-testing device connected to the amplitude discriminator is actuated. This device investigates whether the tone signal is constantly present during a given signal-testing time. After this condition has been satisfied, the signal sources of the frequency channels of the tested tone signals are released.

An undisturbed tone signal will actuate the signal-testing device after having been present for the build-up period of the resonant circuit. A signal supplied by an amplitude limiter and having the desired signalling frequency has an energy contents which is proportional to the relation between the tone signal applied to the limiter and the undesired signals applied thereto, such as speech, noise and other tone signals. A tone signal which is accompanied by so many undesired signals that the discrimination level is not exceeded, is called disturbed tone signal. A disturbed tone signal builds up the resonant circuit to a given value. When the interference signal disappears, the undisturbed tone signal will build up the resonant circuit further, and after a period which is smaller than the build-up period of the resonant circuit it will actuate the signal-testing device. This procedure has the drawback that the period during which an undisturbed tone signal must be present before it is approved by the signal-testing device, depends on whether or not a disturbed tone signal has been present immediately before this instant.

The invention has for its object to eliminate this drawback and to provide a signal receiver whose signal-testing device is actuated at the instant that an undisturbed tone signal is received.

The signal receiver according to the invention is characterized in that between the filter devices of the frequency channels and the signal-testing device a signal increase discriminating device is provided which is continuously switched on in order to actuate the signal-testing device in accordance with the increasing of a signal voltage supplied by the filter devices.

In order that the invention may be readily carried into effect, some embodiments thereof will now be described in detail, by way of example, with reference to the accompanying diagrammatic drawings, components having the same operation being correspondingly denoted, in which.

Figure 1:
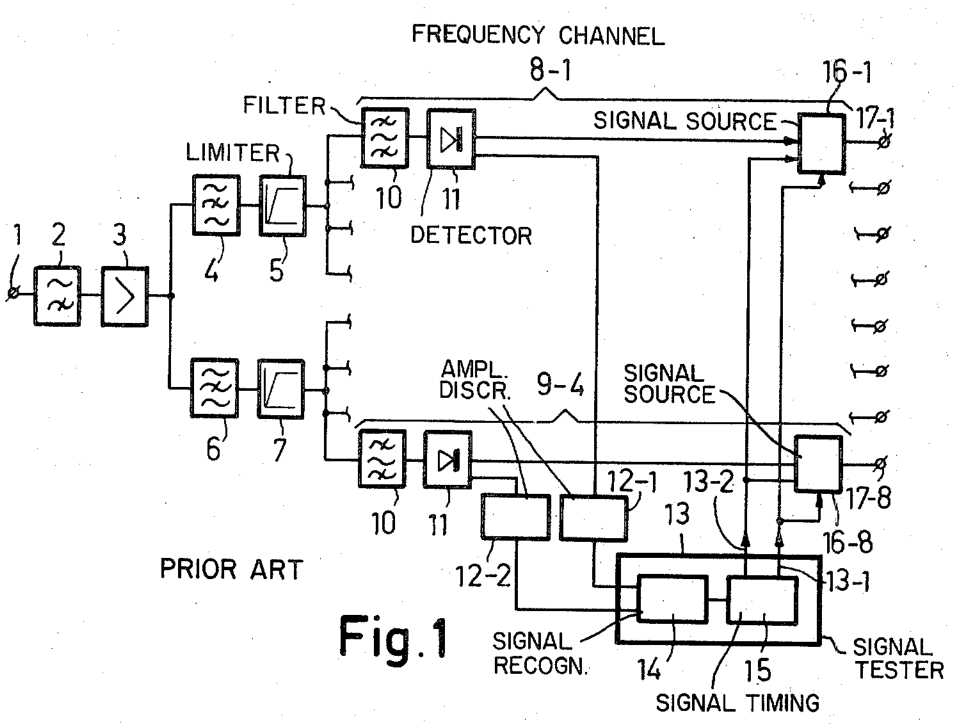
FIG. 1 shows a block diagram of a known signal receiver.

The signal receiver described hereinafter serves for use in a special tone-frequency push-button selection signalling system. In this signalling system use is made of two different frequency bands which are situated within the frequency band of a speech channel, four fixed signalling frequencies being present in each frequency band. For the transmission of a part of the information, a signalling frequency of one frequency band is combined with a signalling frequency from the other frequency band. Each part of information is thus transmitted in a given frequency code. The general construction of the signal receiver will first be described with reference to FIG. 1. The signals received on the input terminal 1 are applied to an input amplifier 3 via a high-pass filter 2, two band-stop filters 4 and 6 being connected to the said input amplifier 3. These band-stop filters separate the two frequency bands by stopping the undesired frequency band. Connected to the band-stop filters are the amplitude limiters 5 and 7, each of which controls four frequency channels 8-1 to 8-4 and 9-1 to 9-4, respectively, only the channels 8-1 and 9-4 being shown in FIG. 1. The construction of the frequency channels is the same and each channel successively comprises a filter 10 which is tuned to the signalling frequency of the channel itself, a detector 11, and a signal source 16 (16-1 in channel 8-1, 16 . . . 16-8 in channel 9-4). An amplitude discriminator 12-1 is connected to one output of each detector 11 of the frequency channels 8-1 to 8-4. Similarly, one output of each detector 11 of the frequency channels 9-1 to 9-4 is connected to an amplitude discriminator 12-2. These amplitude discriminators have a permanently adjusted discrimination level.

The outputs of these amplitude discriminators are connected to a signal-testing device 13, comprising a signal-recognition device 14 and a signal-timing device 15 which is connected thereto. When the code of a signal received on input terminal 1 has been recognized, the signal-recognition device 14 supplies a signal to the signal-timing device 15. This signal-timing device 15 investigates whether the code is present without interruption during a predetermined investigation period. In reaction thereto, the signal-timing device 15, after approval, successively applies a pulse to the signal sources 16-1 to 16-8 via signal conductor 13-1 and via signal conductor 13-2, each of the said signal sources comprising, for example, a bistable element and an AND-gate. In each frequency channel the output of detector 11 is connected, via the AND-gate, to the set input of the bistable element, together with a branch of signal conductor 13-2, and a branch of the signal conductor 13-1 is connected to the reset input of this bistable element. The pulse supplied via signal conductor 13-1 resets all bistable elements. The pulse supplied via signal conductor 13-2 sets, in conjunction with the code signals of the two actuated detectors, the bistable elements connected thereto. The outputs 17-1 to 17-8 of the signal sources 16-1 to 16-8 form the outputs of the frequency channels 8-1 to 9-4, to which is connected a recording device not shown for recording the signals supplied by the signal sources.

A protection against actuation of the signal-testing device 13 by disturbed tone signals is obtained as follows by the combined action of the amplitude limiter 5, 7 and one of the filter devices 10 and the amplitude discriminator 12-1, 12-2. The energy contents of a tone signal supplied by the amplitude limiter 5,7 are dependent of the number and the intensity of noise, interference and other tone signals which are applied to the input of the amplitude limiter 5, 7 together with the tone signal. Each of the filter devices 10 comprises a series-resonant circuit. A tone signal supplied by the limiter 5, 7 will build up an increasing signal voltage across the coil of a series-resonant circuit during the build-up period of this circuit, the amplitude of the signal voltage being determined by the energy contents of this tone signal. The fixed discrimination level of the amplitude discriminator 12-1, 12-2 has a value such that only a signal containing substantially the total energy supplied by the limiter 5,7 can build up a signal voltage across the coil of the series-resonant circuit which exceeds the discrimination level. When the discrimination level is exceeded, the signal-testing device 13 is actuated. The energy contents of a disturbed tone signal amount to part of the total energy supplied by the limiter. Consequently, disturbed tone signals are not capable of building up a signal voltage across the coil of a series-resonant circuit which can exceed the discrimination level, so they cannot actuate the signal-testing device 13. Because the fixed discrimination level for the protection against actuation of the signal-testing device 13 by disturbed tone signals is chosen to be so high that this level can be exceeded only by undisturbed tone signals after the series-resonant circuit has been fully built up, the signal-testing time is prolonged by this build-up time.

In practice the build-up time of a series resonant circuit amounts to approximately 10 ms. The signal-testing time of the signal-testing device is, for example, 30 ms. If the resonant circuit contains no energy at the instant of reception of a tone signal, the total time during which an undisturbed tone signal must be present before it is approved by the signal-testing device 13 amounts to 40 ms.

A disturbed code signal will build up the voltage across the coil of the series-resonant circuit to a value of the tone signal which is determined by the limiter 5, 7 in accordance with the value of the interference. When the interference is removed, the undisturbed tone signal will build up the series-resonant circuit further and will exceed the fixed discrimination level of the amplitude discriminator 12-1, 12-2. The build-up time required for this purpose depends on the value of the voltage across the coil, determined by the disturbed tone signal, and varies accordingly between zero and 10 ms. An undisturbed tone signal having a signal time of between 30 and 40 ms will be approved or not in accordance with the intensity of the interference of a preceding disturbed tone signal. Consequently, the time during which an undisturbed tone signal must be present before it is approved may vary greatly.

Figure 2:
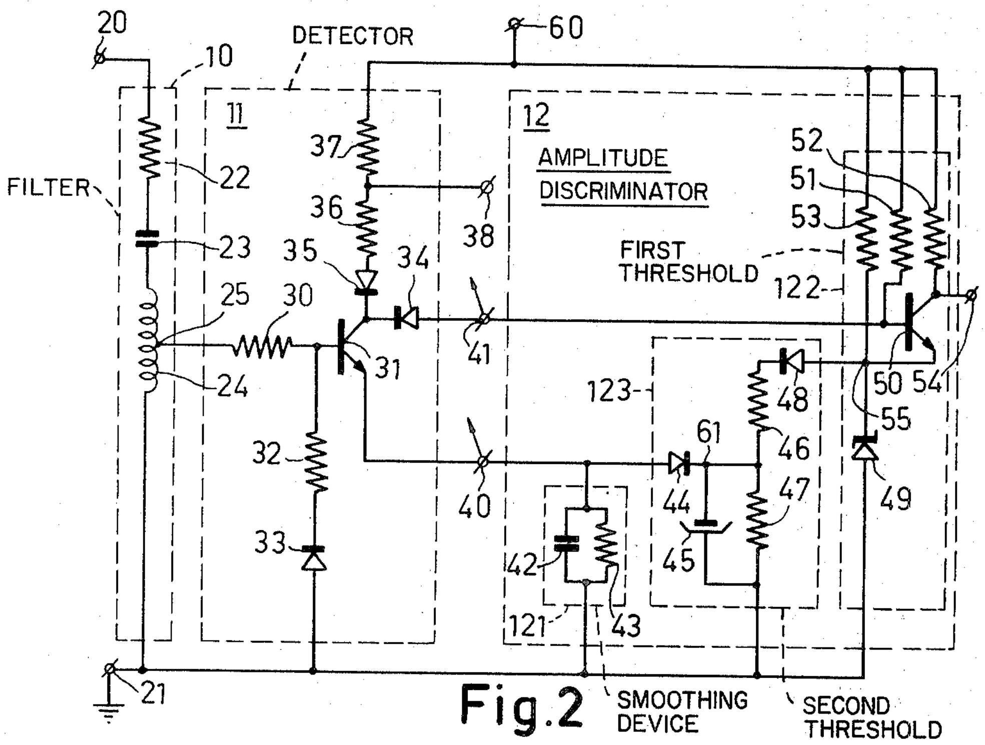
FIG. 2 shows an embodiment of a portion of the signal receiver shown in FIG. 1 which has been improved in accordance with the invention.

The invention has for its object to eliminate this drawback and to provide a signal receiver in which the amplitude discriminator 12 comprises, as is shown in FIG. 2, a smoothing device 121, a first threshold device 122, and a second threshold device 123.

This FIG. 2 also shows a filter device 10 and a portion of a detector 11 of one of the frequency channels 8-1 to 9-4. The detector 11, in conjunction with the smoothing device 121 and the first threshold device 122, continuously has a signal-increase discriminating action for actuating the signal-testing device 13 in accordance with the increasing of a signal voltage supplied by the filter devices. It is thus achieved that the signal-testing device 13 is actuated immediately after reception of an undisturbed tone signal, so that undisturbed tone signals are approved after the signal-testing time of the signal-testing device, independent of the fact whether they are preceded by disturbed tone signals or not.

The input terminals 20, 21 of the filter device 10 shown in FIG. 2 are connected to the output terminals of the amplitude limiter 5, 7 shown in FIG. 1. The filter unit 10 comprises a series-resonant circuit 10 which is formed by the resistor 22, the capacitor 23 and the coil 24. A portion of a signal voltage built up by a tone signal across the coil 24 is applied to the detector 11 via branching point 25. This detector comprises a transistor 31, the base of which receives the signal originating from branching point 25 via resistor 30. So as to protect the base-emitter junction against an excessively high voltage in the reverse direction, the base is connected to earth via resistor 32 and the clipping diode 33 which is connected in the reverse direction.

The collector of this transistor is connected, via the diode 34 which is connected in the reverse direction, to input terminal 41, common to all frequency channels of a frequency band, of the amplitude discriminator 12, and is connected, via the diode 35 which is connected in the reverse direction and resistor 36, to an output terminal 38. This output terminal 38 is coupled on the one side to a signal source 16 not shown, and on the other side, via resistor 37, to a positive voltage terminal 60 of a supply source not shown which is connected between this terminal and earth.

The emitter of transistor 31 is connected to input terminal 40, common to all channels of a frequency band, of the amplitude discriminator 12.

The input terminal 40 of the signal discriminator 12 forms the input of the smoothing device 121, comprising a parallel connection of a capacitor 42 and a resistor 43 which are connected between the input terminal 40 and earth.

Figure 3A:
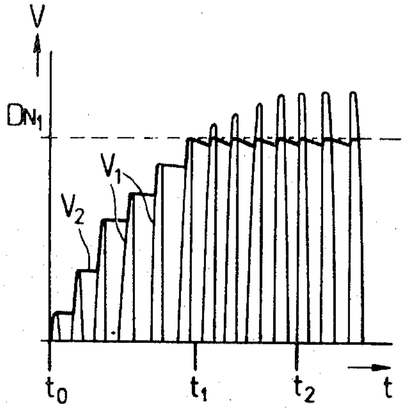
FIGS. 3A and 3B and FIGS. 4A and 4B show signal voltages which can occur in the portion of the signal receiver shown in FIG. 2.
Figure 4A:
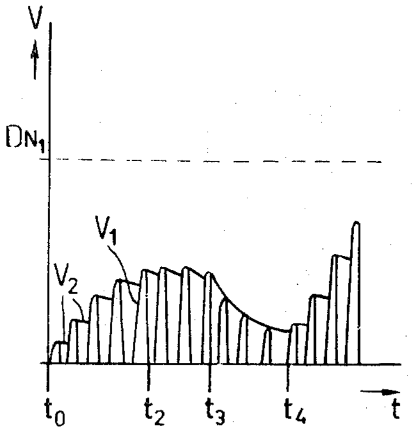

A received signal containing a signal component having a signalling frequency corresponding to the resonant frequency of the series-resonant circuit 22, 23, 24 builds up this circuit. This series-resonant circuit 22, 23, 24 applies a signal to the base of transistor 31, the amplitude of the said signal increasing according to a power *e* during the build-up period of the resonant circuit, and consisting of half sinusoidal, positive voltage peaks due to the fact that diode 33 becomes conducting for negative voltages applied to the base. As described above, an undisturbed tone signal will then build up the resonant circuit 22, 23, 24 to a maximum amplitude. The resultant signal occurring on the base is represented in FIG. 3A as a function of the time by the curves $V_1$. In accordance with the known operation of the limiter 5, 7, a disturbed tone signal builds up the resonant circuit to a lower value. A signal occurring on the base of transistor 31 as a result of this disturbed tone signal is represented in FIG. 4A as a function of the time by the curves which are also denoted by $V_1$.

Figure 3B:
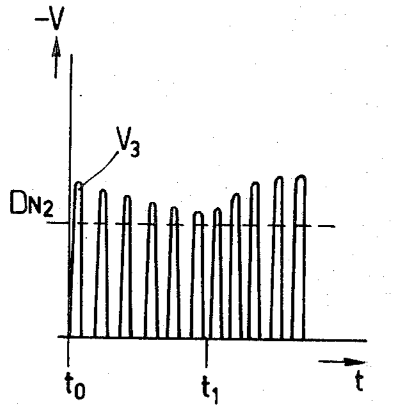
Figure 4B:
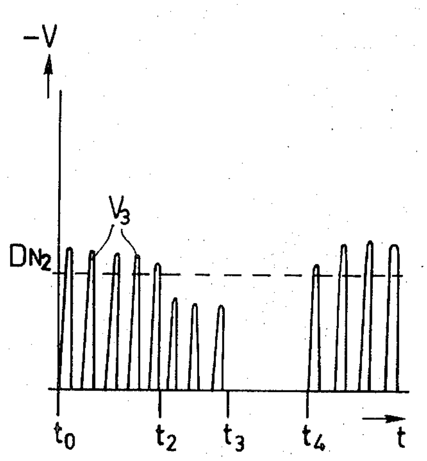

If the capacitor 42 has no charge, the first voltage peak of a signal $V_1$ will render transistor 31 conducting. The current flowing through this transistor charges capacitor 42. Due to the low output impedance of the emitter the voltage across the capacitor 42 follows the base voltage. After the maximum amplitude of the first voltage peak $V_1$ has been reached, the voltage on the base of transistor 31 decreases. The capacitor 42 then discharges via resistor 43. The time constant of the capacitor 42 and resistor 43 is chosen to be such that the capacitor 43 discharges only slowly. In FIGS. 3A and 4A the curve $V_2$ represents the voltage across the capacitor 42. The transistor 31 is cut off by this bias voltage on the emitter when the base voltage decreases, and remains cut off until the second positive voltage peak on the base of transistor 31, having a higher amplitude than the first positive voltage peak due to the fact that the resonant circuit 22, 23, 24 is being built up, exceeds the voltage across the capacitor 42. Transistor 31 then becomes conducting again and charges the capacitor 42 to the maximum amplitude of the second voltage peak, etc. The voltage variations across resistor 37, caused by the charging currents in the collector circuit, are applied, via output terminal 38, to signal source 16 which is connected thereto. The voltage variations which are caused across the resistors 36 and 37 by the charging currents render diode 34 conducting, so that these voltage variations are applied to the input terminal 41 of the amplitude discriminator 12. The voltage of input terminal 41 is represented in FIGS. 3B and 4B as a function of the time by the curves $V_3$ a negative voltage distribution being plotted along the ordinate.

The input terminal 41 is the input terminal of the first threshold device 122. TYis device comprises a transistor 50 whose base and collector are connected to the positive voltage terminal 60 via the resistors 51 and 52, respectively, its emitter being connected to a positive voltage terminal 55. This terminal 55 forms the branching point of a series connection of a Zener diode 49 and a resistor 53 which is connected between earth and the positive voltage terminal 60. The voltage across the resistor 53 forms the fixed threshold of this first threshold unit 122, the said threshold being denoted in the FIGS. 3B and 4B by the line $DN_2$.

The transistor 50 is normally conducting.

During the build-up period of the resonant circuit 22, 23, 24 the charging currents of capacitor 42 have a value which is so high that the resultant voltage decreases appearing on the base of transistor 50 have values which are capable of exceeding the value of the threshold $DN_2$. As a result, the transistor 50 is cut off. The voltage on the output terminal 54, which is connected to the collector and to which the signal-testing device 13 is connected, then changes from a low positive value to the high positive value of terminal 60. This positive voltage variation actuates the signal-testing device 13, which remains operative during at least one period of the resonant frequency of the series-resonant circuit 22, 23, 24. It is thus achieved that the signal-testing device 13 is actuated immediately after reception of a signal component having a signalling frequency, and remains active as long as the voltage across the inductance of the resonant circuit increases.

The increase of the voltage across the inductance 24 of the resonant circuit 22, 23, 24 slows down during the build-up period until the instant $t_2$, as is illustrated in FIGS. 3A and 4A. As a result, the amplitude of the negative voltage peaks $V_3$ applied to the base of transistor 50 decreases as the resonant circuit 22, 23, 24 is further built up, as is illustrated in the FIGS. 3B and 4B for the signals appearing until the instant $t_1$. When the resonant circuit 22, 23, 24 has been fully built up, the voltage signal supplied by this circuit has a constant amplitude.

The current which charges the capacitor 42 due to the appearance of a voltage peak on the base of transistor 31, then only supplements the charge which, after the appearance of the previous voltage peak on the base, has depleted via the resistor 43. The voltage drop caused by this small charging current across the resistors 36 and 37 is accordingly small. The value of this voltage drop across the resistors 36 and 37 is used for determining whether the resonant circuit 22, 23, 24 has been built up, after which a distinction is made between disturbed and undisturbed tone signals.

To this end the value of the threshold $DN_2$ is chosen in accordance with the RC-time of resistor 43 and capacitor 42 such that this threshold value is not exceeded by voltage variations caused by charging currents occurring after the resonant circuit 22, 23, 24 has been built up, so that transistor 50 is no longer cut off. This is illustrated in FIG. 4B by the signals represented by the curves $V_3$ which are situated between the instants $t_2$ and $t_3$ and which are caused by the signal voltage of constant amplitude represented in FIG. 4A by the curves $V_1$, situated between the same instants $t_2$ and $t_3$. It is thus achieved that the signal-testing device 13, actuated by the first voltage peak produced by the series-resonant circuit 22, 23, 24 after reception of a signal having a signalling frequency, is switched off again after the series-resonant circuit 22, 23, 24 has been built up.

The second threshold device 123 is provided to prevent that, after reception of an undisturbed tone signal, the signal-testing device 13 is switched off after the series-resonant circuit 22, 23, 24 has been built up.

The input terminal 40 of the amplitude discriminator 12 forms the input terminal of this second threshold device 123. This input terminal 40 is connected, via a clipping diode 44, to a branching point 61 of a voltage divider connected across the zener diode 49. This voltage divider is formed by the diode 48 and the resistors 46 and 47. The value of the voltage of branching point 61 determines how far the voltage across the capacitor 42 can increase, and acts as a fixed threshold value of this second threshold device 123. This threshold value is represented in FIGS. 3A and 4A by the level denoted by $DN_1$. If a voltage peak applied to the base of transistor 31 tends to increase the voltage across the capacitor 42 beyond the threshold value $DN_1$, the diode 44 will become conducting and the emitter current of transistor 31 is depleted to earth via this diode and the resistor 47. In order to prevent the voltage across the resistor 47 from increasing too much during these instants, a smoothing capacitor 45 is connected in parallel with this resistor 47.

The value of the threshold $DN_1$ has been chosen to be such that only the voltage peaks supplied to the base of transistor 31, caused by a received, undisturbed tone signal after the resonant circuit 22, 23, 24 has been built up, exceed the threshold $DN_1$ so far that also the threshold $DN_2$ is exceeded. This is shown in the FIGS. 3A and 3B for the signals appearing after the instant $t_1$.

As appears from the foregoing and from FIG. 3B, the signal-testing device 13 is actuated immediately after reception of an undisturbed tone signal which is not preceded, during a period which is sufficiently long for depleting any charge present across the capacitor 42, by a disturbed tone signal, and is kept in operation for as long as the undisturbed tone signal is received. It is thus achieved that the period during which an undisturbed code signal must be present before it is approved by the signal-testing device 13 is equal to the signal-testing time of the signal-testing device.

For the disturbed tone signal shown in FIG. 4A it is assumed that the intensity of the undesired signals in the disturbed tone signal increases greatly between the instants $t_3$ and $t_4$. As a result, a very weak tone signal is applied to the resonant circuit so that the latter will decay. During this time voltage peaks are supplied on the base of transistor 31, the amplitudes of which decreases according to a power *e*. The RC-time of the capacitor 42 and the resistor 43 is chosen to be equal to or slightly larger than the time constant of the series resonant circuit 22, 23, 24 during the decay of this circuit. It is thus achieved, on the one hand, that the transistor 31 remains cut off during the decay of the resonant circuit 22, 23, 24. This is represented in FIGS. 4A and 4B by the signals occurring between the instants $t_3$ and $t_4$. On the other hand, it is achieved that the signal-testing device 13 is actuated as soon as possible again upon reappearance of a signal having a signal component containing the signalling frequency for which the series resonant circuit 22, 23, 24 is resonant. This will be described with reference to the FIGS. 4A and 4B. For the disturbed tone signal shown in FIG. 4A it is assumed that the undesired signal components disappear at the instant $t_4$. An undisturbed tone signal is then received as of this instant $t_4$.

This undisturbed tone signal will immediately build up the resonant circuit 22, 23, 24 as the oscillation present in the circuit 22, 23, 24 is in phase with the undisturbed tone signal due to the fact that it is generated by the same tone signal. Moreover, at the instant $t_4$ the charge across the capacitor 42 is almost equal to the voltage supplied by the resonant circuit to the base of transistor 31, so that the next voltage peak supplied by the resonant circuit 22, 23, 24, which is again being built up, is already capable of exceeding the voltage across the capacitor 42. As a result, the transistor 31 becomes conducting again and the voltage drop across the collector resistors 36 and 37 becomes so large that the threshold $DN_2$ is exceeded. The foregoing demonstrates that, upon reception of a disturbed tone signal whose interference disappears at a given instant, the signal-testing device 13 is immediately actuated by the tone signal which is then undisturbed. This device 13 is kept in operation in a manner similar as described above for the reception of an undisturbed tone signal.

Consequently, an undisturbed code signal which is preceded by a disturbed code signal is approved after having been present without interruption during the signal-testing time of the signal-testing device 13. The foregoing shows that an undisturbed tone signal actuates the signal-testing device immediately after it has been received, independent of whether or not it is preceded by a disturbed tone signal. As a result, all undisturbed tone signals received are subjected to one and the same presence-time criterion before being approved.

What is claimed is:

1. A signal receiver comprising:

a plurality of frequency channels; each channel including filter means tuned to a respective different signal frequency, detecting means connected to said filter means;

discriminating means including a parallel connection of a capacitor and a resistor coupled to the input of said detecting means and having a time constant sufficient for producing a bias voltage corresponding substantially to amplitude increments during the initial build-up period of a signal in said filter means, thereby causing said detecting means to respond only to signals of increasing amplitude, and a threshold circuit coupled to the output of said detecting means for passing signals having amplitude increments greater than a predetermined threshold value;

and signal testing means coupled to said discriminating means for responding to those signals only which exceed said threshold value during a predetermined testing period.

2. A signal receiver according to claim 1, further comprising an additional threshold circuit coupled to said parallel connection to limit said bias voltage to a predetermined second threshold value.

3. A signal receiver according to claim 2, wherein said detecting means includes a first transistor having a base connected to said filter means, an emitter grounded through said parallel connection, and a collector connected to said threshold circuit through a detecting diode.

4. A signal receiver according to claim 3, wherein said threshold circuit includes a second transistor having a base connected to said detecting diode, an emitter grounded through a reference voltage source determining threshold value and a collector connected to said signal testing means.

* * * * *